United States Patent [19]

Müller

[11] 4,379,984
[45] Apr. 12, 1983

[54] BRUSHLESS DC MOTOR DRIVEN BY COMPLEMENTARY TYPE TRANSISTORS

[75] Inventor: Rolf Müller, St. Georgen, Fed. Rep. of Germany

[73] Assignee: Papst-Motoren GmbH & Co. KG, St. Georgen, Fed. Rep. of Germany

[21] Appl. No.: 250,011

[22] Filed: Apr. 1, 1981

[30] Foreign Application Priority Data

Jun. 19, 1980 [DE] Fed. Rep. of Germany ....... 3022836

[51] Int. Cl.³ ............................................. H02K 29/00
[52] U.S. Cl. ..................................... 318/254; 318/138
[58] Field of Search ................. 318/138, 139, 254, 439

[56] References Cited

U.S. PATENT DOCUMENTS 3,025,443 3/1962 Wilkinson et al. .
3,453,513 7/1969 Rakes et al. .
4,025,831 4/1977 Webb .............................. 318/254
4,286,198 8/1981 Valroger ........................... 318/138

FOREIGN PATENT DOCUMENTS 7303636 9/1980 France .

Primary Examiner—J. V. Truhe
Assistant Examiner—S. M. Bergmann
Attorney, Agent, or Firm—Frishauf, Holtz, Goodman & Woodward

[57] ABSTRACT

A first pair of complementary transistors with their collectors connected to one terminal of the motor winding are alternately switched on by a rectangular wave produced by a Hall-IC responding to the magnetic field of a permanent magnet rotor, the square wave being coupled to these transistors through a resistor network and series capacitors. At the same time, another pair of complementary transistors, having their emitters connected to the other terminal of the motor winding, is directly switched by the Hall-IC, so that they operate as voltage followers to complete the path of the current pulses of the winding through the other half of a full-bridge circuit. Thus, one signal from a single sensor of rotor position operates a stator winding with full protection of the components while using a minimum of circuit elements. Such a motor makes possible ventilating fans of small axial length for use in compact apparatus.

10 Claims, 4 Drawing Figures

BRUSHLESS DC MOTOR DRIVEN BY COMPLEMENTARY TYPE TRANSISTORS

This invention concerns brushless d.c. motors having at least one motor winding connected to a bridge or half bridge circuit controlled by a rotor-position sensor for feeding to the motor winding two current pulses for every 360 electrical degrees of rotor rotation. In particular, the invention concerns such motors in which the bridge circuit has a pair of transistors of opposite conductivity type connected in series, with the emitters of the transistors connected to the poles of the supply voltage (so-called "emitter circuit" for operating such a transistor pair).

A motor of this general type is known, for example, from my article on two-pulse brushless d.c. motor published by "asr-digest für angewandte Antriebstechnik", 1977, No. 1-2, pp. 27-31. In particular, FIGS. 2 and 5 of that article show respectively two-pulse and four-pulse motors of this kind. In this connection, "two-pulse" signifies that the stator winding receives two current pulses per rotor movement of 360 electrical degrees, and "four-pulse" signifies that the stator winding receives four current pulses per 360° el. of rotor revolution, as is clearly explained in the article.

In the kind of bridge circuits utilized for driving such motors, there is a difficulty in controlling the semiconductor control devices of the bridge circuits in a simple way. The solutions of this problem heretofore known, as shown for example in U.S. Pat. No. 3,025,443, compare particularly FIG. 4 thereof, are complicated and expensive and therefore unsuitable for applications in which the combination of optimal function and economical pricing is important.

THE INVENTION

It is an object of the present invention to improve the simplicity and hence the economy of motors of the type just discussed by improving the control and driving arrangement.

Briefly, this object is obtained by utilizing a single rotor-position signal in a manner in which it can turn on and off both bridge transistors of a complementary type pair (sometimes referred to as an opposite conductivity type pair). It has been found that such a control of both transistors of such a pair can be effectively accomplished to great advantage by a resistor network.

A number of other features of the invention are described in the detailed description that follows below. Among them, a particularly valuable and important further development of the invention, involving the use of a full bridge rather than a half bridge (both a half bridge and a full bridge are referred to generically herein as "bridge" circuits) involves a full bridge circuit having two pairs of complementary transistors, the second pair being in so-called "collector circuit", meaning that the collectors are connected to the poles of the supply voltage. In such case, the motor winding is connected between the common collector connection of the first pair and the common emitter connection of the second pair. In this embodiment of the invention, the control electrodes of the second pair of complementary transistors are supplied with essentially the same rotor-position signal as the transistors of the first pair, and this is preferably done without the interposition of any RC circuit.

THE DRAWINGS

Further details and advantageous developments of the invention will be evident from the illustrative examples described below with reference to the annexed drawings, which are in no way to be understood as limiting the invention. In the drawings.

DESCRIPTION OF THE ILLUSTRATED EMBODIMENTS

Figure 1:
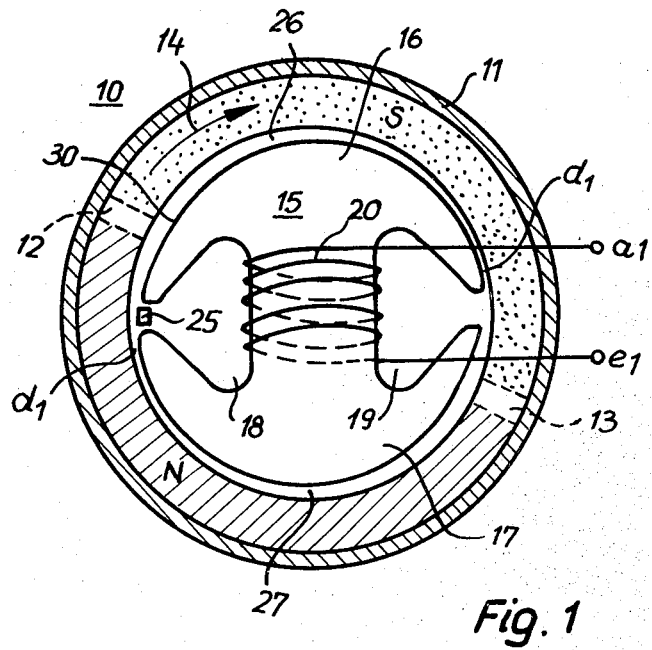
FIG. 1 is a schematic representation of a single-winding two-pulse external-rotor brushless d.c. motor of a known type of construction.

In the following description, parts that are the same or that operate in the same manner are designated in the several figures of the drawings with the same reference numerals and are usually described only once.

FIG. 1 shows, as background for better understanding of the invention, an external-rotor motor 10 having a two-pole rotor 11 constituted as a complete magnetic ring having its magnetization substantially trapezoidal, providing a practically constant magnetic flux density in the region of the pole and having narrow pole gaps 12,13. The rotor encircles the stator 15.

The portions of the rotor having practically constant flux density are shown in FIG. 1 with diagonal shading for the north pole and with stippled shading for the south pole. The rotor 11 is constituted as a radially magnetized permanent magnet part, its permanent magnet being made, for example, of barium ferrite or of a so-called "rubber magnet" composition. FIG. 1 shows the rotor 11 in one of its two stable rest positions which it can assume in the no-current condition of the motor. These rest positions are determined by the shape of the air gap and the shape of the magnetization. In operation the rotor 11 turns in the direction of the arrow 14.

The stator 15 of the motor 10 is constituted as a double T armature with an upper pole 16 and a lower pole 17, both of which are in more or less umbrella shape contour, so that in each case they span almost the entire pole arc and together they form deep slots 18 and 19 in which a winding 20 around the armature yoke is wound. The ends of the winding are connected with terminals a1 and e1.

A rotor-position sensor 25, in this case a Hall-IC, is mounted adjacent to the stator in a position that corresponds more or less to the opening of the slot 18, or else offset by a few degrees from that opening in a direction opposite to the direction of rotation 14, which means counterclockwise in FIG. 1.

Figure 3:
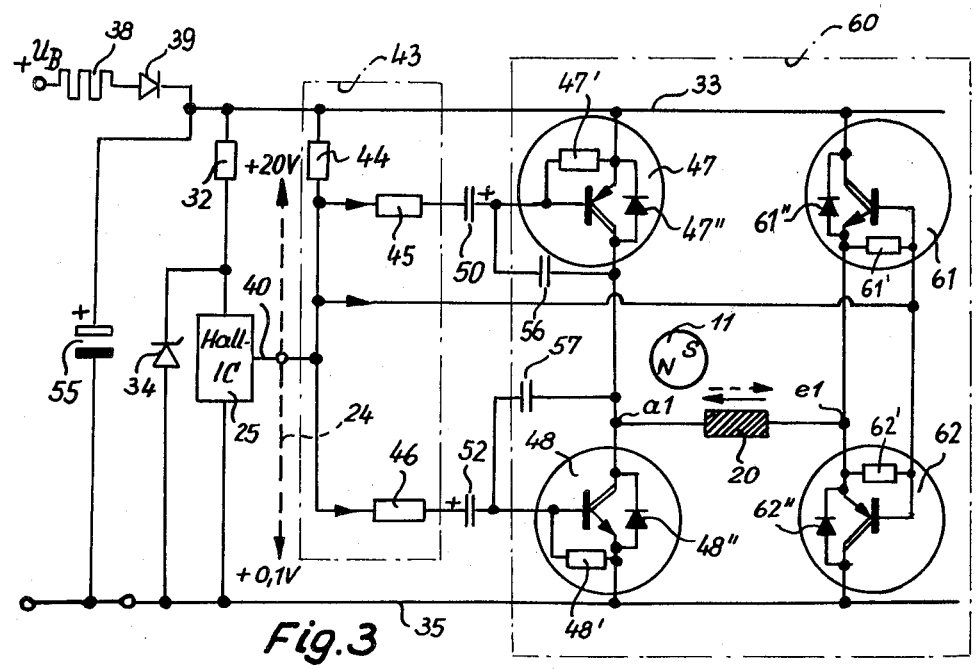
FIG. 3 is a circuit diagram of a second embodiment of bridge circuit for operating the motor of FIG. 1, in this case a full bridge circuit.

The Hall-IC 25 is controlled by the magnetic field of the permanent magnet rotor 11 and provides a signal dependent upon the rotor position that is either at a high value or at a low value, thus practically a rectangular signal during rotation of the rotor 11, the high and low portions of the signal being in each case about 180° long. As shown in FIG. 3, by the broken-line arrow 24, this signal, at an operating voltage $U_B$ of 24 volts, has a voltage range from about 0 volts (signal low) to about 22 volts (signal high), and at least from 0.1 V to 20 V, as indicated on FIG. 3. The air gap 26 above the stator pole 16 and the air gap 27 over the stator pole 17 are formed in a special way. Beginning with the slot 18 and going in the direction of rotation 14, the gap 26 increases over about 10°...15° monotonically up to a first position 30 at which it reaches its maximum. From there on, the gap 26 becomes monotonically smaller over about 170° until about at the opening of the slot 19, where it reaches it minimum value d1. The air gap 27 has, as shown, an identical shape. This air gap shape, in cooperation with the kind of magnetization of the rotor 11 that has been described, produces in operation a reluctance torque of particular form, as is explained in detail in German Pat. No. 2,346,380, to which reference may be made in order to shorten this description. Of course, instead of a motor of the kind shown in FIG. 1, there can also be used for the purposes of the present invention an internal-rotor motor or a flat motor with an ironless stator of the kind shown in U.S. Pat. No. 3,840,761, or for example, a four-pulse, double-winding motor as described in my article referred to at the beginning of this specification. The invention is, thus, in no way limited to the kind of motor shown in FIG. 1, the latter serving merely to make the invention better understood by way of a concrete example.

Figure 2:
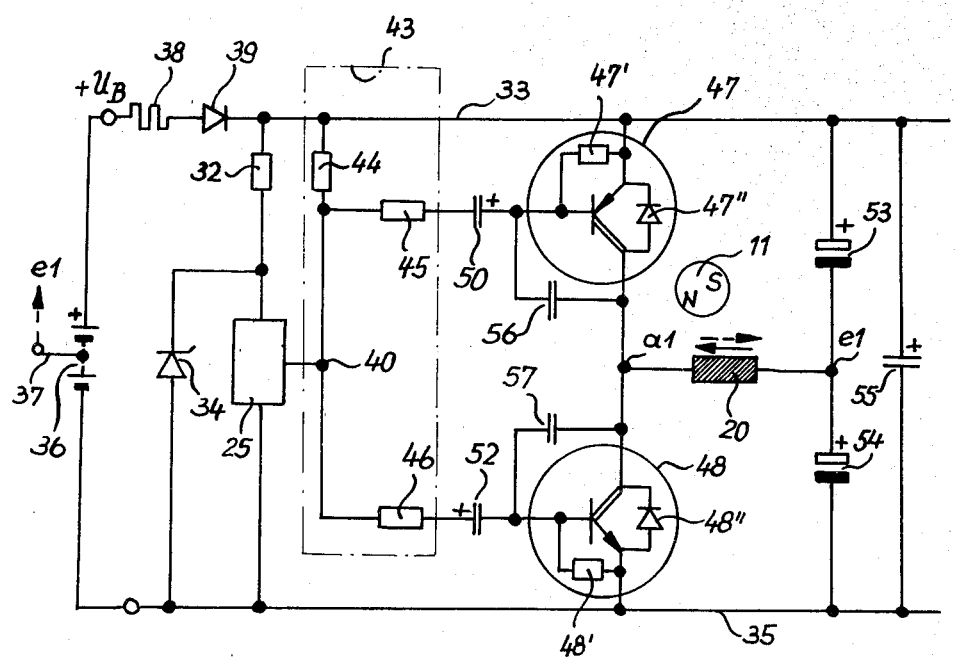
FIG. 2 is a first illustrative embodiment of a bridge circuit for operation of the motor of FIG. 1, in this case a half bridge circuit.

FIG. 2 shows a first embodiment of the invention in which the bridge circuit is a half-bridge circuit and the terminal e1 of the winding 20 is connected to a substantially fixed potential, for example to a center tap of the supply voltage.

The Hall-IC 25 that of course can be replaced by analogous sensor means (for example an optical, inductive or galvanic sensor) that serves as the rotor-position sensor has one of its connections made directly to the negative supply voltage line 35 and the other connected through a resistor 32 to the positive supply voltage line 33. In parallel with the Hall-IC 25 is connected a Zener diode 34 that holds the voltage applied to the Hall-IC constant at a value of, for example, 5 volts.

A battery 36, for example with a voltage of 24 V is illustrated as serving as the voltage supply. If, as shown, the battery 36 has a central tap 37, this can be connected with the winding terminal e1 (three conductor system). A fuse resistor 38 is provided at the positive pole of the battery 36 and also, in series with the fuse, a diode 39 for protection against connecting the battery to apply the wrong potential to the positive supply line 33. The resistor 38 is so designed that it melts and breaks the circuit after a few seconds in the case of a short circuit in the motor and thereby prevents burning out the winding 20.

The output 40 of the Hall-IC 25 is connected to a resistor network 43 that consists of three resistors 44,45 and 46. The resistor 44 leads from the output 40 to the positive voltage supply line 33 and constitutes the so-called working or load resistance of the Hall-IC 25. The resistor 45 leads to the base of a pnp Darlington transistor 47 and the resistor 46 leads to the base of an npn Darlington transistor 48. The transistors 47 and 48 are mutually complementary, because of their opposite conductivity types. They form the semiconductor control means of the half-bridge. Each Darlington transistor 47, 48 contains a base-emitter leak resistance 47′, 48′ and a reverse-kick by-pass diode 47″, 48″. Both transistors are connected in so-called emitter circuits, i.e. the emitter of transistor 47 is connected to the positive supply voltage line 33 and the emitter of transistor 48 is connected with the negative voltage supply line 35, while the collectors of the two transistors are connected together and with the terminal a1 of the stator winding 20.

Between the resistance 45 and the base of the transistor 47 is interposed a coupling capacitor 50 and, likewise, a coupling capacitor 52 is interposed between the resistance 46 and the base of the transistor 48. There are thus provided two RC networks 45–50, 46–52 which, on the one hand, make the motor stall-proof and, on the other hand, prevent the occurrence of a short circuit that would result from both transistors 47 and 48 being simultaneously fully conducting, a condition which would at once destroy these transistors.

If the battery 36 should have no center tap 37, the terminal e1 of the winding 20 is connected to a capacitive voltage divider. In the circuit of FIG. 2, such a divider is shown consisting of two capacitors 53 and 54, of which 53 is connected between the terminal e1 and the positive voltage supply line 33 and 54 between the terminal e1 and the negative voltage supply line 35. These capacitors 53 and 54 are of equal magnitude and have values of the order of magnitude of 200 $\mu$F, so that the terminal e1 in operation assumes a potential that is about half of the voltage between the lines 33 and 35. Particularly for the case when the terminal e1 is connected to the center tap 37 of the battery 36 and when the capacitors 53 and 54 are not used, it is useful to provide a filter capacitor 55 also. FIG. 2 shows all these components, which can of course be used all at the same time, but it is to be understood that if the center tap 37 is available the capacitors 53 and 54 are not necessary, whereas if the center tap 37 is unavailable, the capacitors 53 and 54 are necessary for the connection of the terminal e1 and the filter capacitor 55 is not necessary.

In order to prevent or reduce high frequency oscillations taking place in the transistors 47 and 48, between the emitter and collector of each of these transistors, a small capacitor 56,57 is provided.

As shown in FIG. 1, the Hall-IC 25 stands opposite a north pole N of the rotor 11, so that the output 40 of the Hall-IC 25 is at a low potential at or near 0 volts, with the result that the transistor 48 is blocked and the transistor 47 is made conducting. A current then flows from the positive voltage supply line 33, through the transistor 47, the winding 20 (from a1 to e1) and the capacitor 54 to the negative voltage line 35, in response to which the stator pole 16 becomes a south pole and the stator pole 17 a north pole, as the result of which the rotor 11 begins to turn in the direction of the arrow 14, thus clockwise. While this current flows, a charging current flows to the capacitor 50 through the emitter-base path of the transistor 47 and the leak resistance 47′, as the result of which the transistor 47 receives the necessary base current.

If now the south pole of the rotor 11 reaches the rotor-position sensor 25, the potential of the output 40 of the Hall-Ic 25 rises to its high value, e.g. plus 22 V, transistor 47 is blocked and the transistor 48 is made conducting. The capacitor 50 then discharges partly over the resistances 44,45 and 47′, so that its charge voltage drops back, while now, conversely, a charging current flows through the capacitor 57 over the emitter-base path of the transistor 48 and makes the transistor 48 conducting, so that a current flows from the positive voltage supply line 33, through the capacitor 53, the winding 20 (from e1 to a1) and the transistor 48 to the negative voltage supply line 35. The stator pole 16 then becomes a north pole and the stator pole 17 a south pole, so that the rotor 11 continues to turn clockwise.

During commutation between transistors 47 and 48, or vice versa, a current gap takes place that is produced essentially by the RC networks 45–50 and 46–52, alternately, and the strongly non-linear input resistance of the base-emitter paths of the transistors 47 and 48. To this current gap there corresponds in each case a gap in the electromagnetically produced torque, and this torque gap coincides in each case with the angular regions in which the pole gaps 12, 13 pass through regions of increasing magnetically effective air gaps (compare FIG. 1, where the Hall-IC 25 lies about in the middle of such a region of increasing magnetically effective air gap). As the pole gaps pass through this region, magnetically stored energy is taken from the motor which drives the rotor 11 clockwise and thus bridges over the gaps in the electromagnetic driving torque (so-called driving reluctance torque). When the rotor 11 is blocked, for example in the position shown in FIG. 1, the transistor 47 is at first conducting, so long as a sufficiently great charge current flows into the capacitor 50. When the capacitor 50 is then fully charged, which is the case, for example, after two seconds, the transistor 47 no longer receives base current and the motor becomes currentless. When the blocking of the rotor 11 is released, it is sufficient to provide a momentary switching out and in again of the motor to set the motor back into operation. Alternatively, the rotor 11 can also be set into motion again at once by a short rotation pulse.

At an operating voltage of 24 V, for a motor with about 4 watts power consumption operating at 3,000 r.p.m., the operating values for the circuit of FIG. 2 have the following typical values and component types:

| Zener diode 34 | 5.1 V |
| Hall-IC 25 | TL 170 (Texas Instruments) |
| Resistor 44 | 1.8 k ohms |
| Resistances 45,46 | 10 k ohms |
| Resistances 47',48' | 10 k ohms |
| Capacitors 50,52,55 | 22 μF |
| Capacitors 53,54 | 200 μF |
| Capacitors 56,57 | 1500 pF |
| Resistor 32 | 3.3 k ohms |
| Transistor 47 | BD 680 |
| Transistor 48 | BD 679 |

The circuit of FIG. 2 has the disadvantage that it is suitable only for voltage sources having a center tap 37, unless large storage capacitors 53 and 54 are provided, which do not lend themselves easily for provision in a motor unit. For this reason, the circuits shown in FIG. 3 and FIG. 4, which are of full-bridge form, are preferred.

As can be seen at once, the portion of the circuit of FIG. 3 that lies to the left of the winding 20 corresponds completely to the circuit of FIG. 2, so that this portion of the circuit is not described again and is provided with the same reference numerals as in FIG. 2 (the filter capacitor 55 is shown at the left in FIG. 3).

The circuit of FIG. 3 has a full-bridge circuit 60 which consists of the two Darlington transistors 47,48 in so-called emitter circuit and two transistors connected in collector circuit, namely a npn Darlington transistor 61 and a pnp Darlington transistor 62, which are complementary to each other, both having a leak resistance, respectively 61' and 62' and reverse-kick diodes 61'' and 62''. The collector of transistor 61 is connected to the positive voltage supply line 33 and the collector of transistor 62 to the negative voltage supply line 35. The emitters of these transistors are connected together and to the terminal e1 of the stator winding 20. The bases of the transistors 61 and 62 are also connected together and they are connected to the output 40 of the rotor-position sensor 25. The transistors 61 and 62 thus together provide a voltage follower circuit, i.e. the potential at the terminal e1 directly follows—without phase reversal—the potential at the output 40 of the Hall-IC 25. If the output 40 is high, e.g. +22 V, the connection e1 is high, and if the output 40 is low, e.g. zero V, the terminal e1 is low. If no current flows from or to the terminal e1, the current in the transistors 61 and 62 is only very small and independent of the potential at the output 40 of the Hall-IC 25. Whereas, therefore, as described in FIG. 2, a low potential at the output 40 of the Hall-IC 25 signifies that the transistor 47 becomes conducting, so that the terminal a1 takes on a high potential, a low potential at the point 40 signifies also a low potential at the terminal e1, so that therefore in this case a current flows from a1 to e1. Conversely, when there is a high potential at the output 40, a current flows from e1 to a1, since then the transistors 48 and 61 are conducting. Otherwise said: the transistors 47 and 48 produce a phase reversal of the signal at the output 60, but not the transistors 61 and 62, so that the phase reversal necessary for the control of the full-bridge is produced in the full-bridge 60 itself, which can be controlled with a single control signal (push-push) rather than (push-pull), so that the circuit may be referred to as a push-push full-bridge.

If the rotor 11 is blocked, the capacitor 50 or the capacitor 52 charges up fully and the full-bridge 60 then becomes currentless, by blocking the corresponding transistor 47 or 48, as the result of which the voltage follower circuit 61,62 likewise becomes currentless for the reasons already described. The typical values for the circuit of FIG. 3 correspond with those of FIG. 2 with the following exception or additions:

| Transistor 61 | BD 679 |
| Transistor 62 | BD 680 |
| Resistor 44 | 1.2 k ohms |

The circuits of FIG. 2 and FIG. 3 are well suited for operating voltages up to about 30 volts, since the Hall-IC 25 can provide a voltage swing (represented by the broken line arrow 24 in FIG. 3) up to about this magnitude. For higher operating voltages, e.g. 48, 60 or 110 V, the Hall-IC 25 must have an isolation amplifier following it, as illustrated in FIG. 4.

Figure 4:
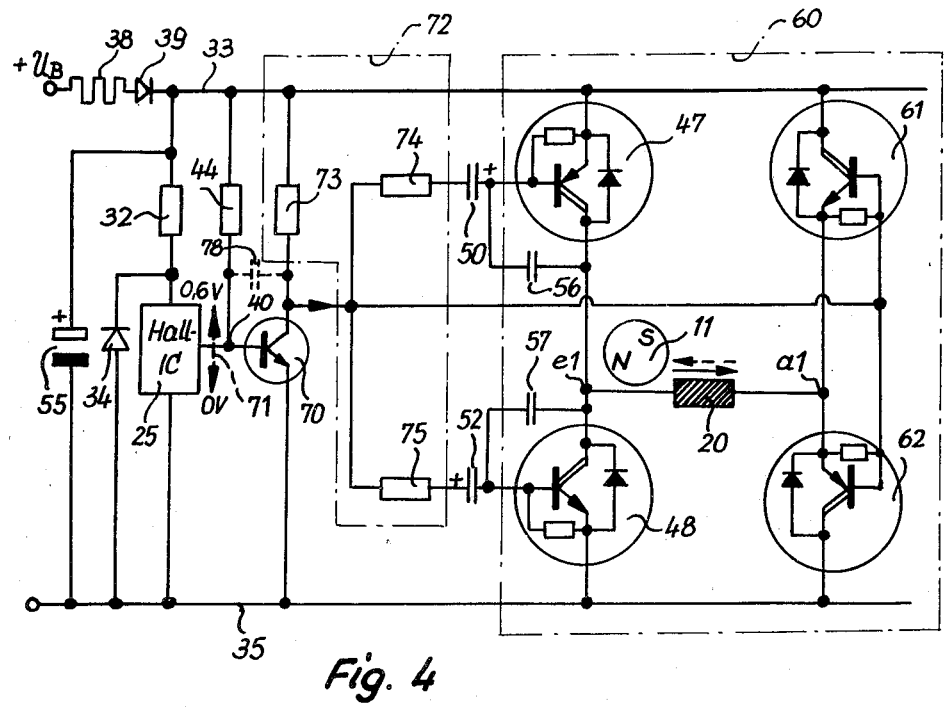
FIG. 4 is a circuit diagram of a third embodiment in the form of a full bridge circuit for higher operating voltages.

In the case of FIG. 4, the output 40 of the Hall-IC 25 is connected to the base of an npn transistor 70 that serves as an isolation amplifier. As indicated in FIG. 4, the voltage swing 71 at the output 40 is limited to a small value between 0 to 0.6 V. The emitter of the transistor 70 is connected directly to the negative voltage supply line 35 and its collector, at which a rotor-position signal of large voltage swing is available, is connected to a resistance network 72 that comprises a collector resistor 73, as well as two resistors 74 and 75, of which one is connected in series with the capacitor 50 and leads to the base of the transistor 47, while the other is connected in series with the capacitor 52 and leads to the base of the transistor 48. The collector of the transistor 70 is also connected to the bases of the two transistors 61 and 62. The bridge circuit 60 is identical with that of FIG. 3.

If a voltage of 48 V exists between the lines 33 and 35, the voltage swing at the collector of the transistor 70 is approximately from 0 to 46 volts, i.e. it is sufficient for control of the four transistors of the full-bridge circuit 60. Since the transistor 70 produces a phase reversal of the signal at the output 40, the stator winding 20 here must be reversed in its connections with respect to the connections in FIG. 3, as shown in FIG. 4, so that the motor 10 will run in the correct direction. Hence, the terminal e1 in FIG. 4 is at the left and the terminal a1 at the right. The manner of operation is in other respects the same as already described in detail in the case of FIG. 3.

The typical values for the circuit of FIG. 4 that are additional to or different from those relating to FIGS. 2 and 3 are as follows:

| Resistor 44 | 10 k ohms |
|---|---|
| Resistor 73 | 2 k ohms |
| Resistors 74 and 75 | 22 k ohms |

It should be particularly noted that the circuit of FIG. 4 makes possible the use of integrated Darlington transistors in the full-bridge circuit 60 for operating voltages up to about 100 V, because the switch-off voltages appearing upon commutation of the winding 20 are very low. This makes it unnecessary for the Darlington circuits to be constituted of discrete components. For still higher voltages, Darlington circuits of discrete components could be used. In the case of low power motors, simple transistors rather than Darlington transistor combinations can be used, and for high voltages, these may be discrete components.

The full-bridge circuit 60 according to FIG. 3 or FIG. 4 is particularly suitable for higher operating voltages, such as are normal, for example, in many telephone systems. The somewhat higher losses from the voltage drop at the transistors 47,48, 61 and 62 are compensated by the smaller copper losses in the winding 20, since the latter can be wound with a larger copper cross-section. Furthermore, the insulation of the winding 20 is simpler than when two windings, particularly two bifilar windings are used.

The invention lends itself naturally to control four- or six-pulse motors. The circuits shown in FIGS. 2, 3 or 4 are then used either in duplicate (four-pulse motor) or in triplicate (six-pulse motor). In such cases, the rotor-position sensors must naturally be off-set relative to each other on the stator structure, e.g. in the case of a four-pulse motor by 90° el. or an equivalent value. In each case, there are two pulses in opposite directions in each winding per 360° el. of rotor movement.

In the circuit of FIG. 4, there can advantageously be provided a small capacitor 78 (e.g. 100 pF) between the base and collector of the pre-amplifier transistor 70, in order to delay slightly the switching flanks of the amplified output voltage of the Hall-IC 25, e.g. by about 50 to 200 μs. A small switching interval is thus obtained, i.e. the transistors 47 and 48 are given a margin of safety to assure that they cannot both be conducting during commutation.

Although the invention has been described with reference to particular illustrative examples, variations and modifications, as already mentioned, are possible within the inventive concept.

The motor is particularly useful for driving ventilating fans of apparatus. With motors of the invention, such fans can be constructed with short axial dimensions.

I claim:

1. A brushless d.c. motor having a rotor, a stationary motor winding (20), a rotor position sensor (25) and means, including a full bridge circuit, for providing to said winding from a d.c. current source (33,35), under control of said sensor, two current pulses per 360° el. of rotation of said rotor and further comprising, in accordance with the invention:

two transistors (47,48) of opposite conductivity type connected in series providing a first pair of adjacent arms of said bridge circuit and having their emitters respectively connected to opposite poles of said d.c. current source and having their collectors connected together and to a first terminal of said motor winding;

two transistors (61,62) of opposite conductivity type connected in series providing a second pair of adjacent arms of said bridge circuit, having their respective collectors connected to said opposite poles of said d.c. current source and having their emitters connected together and to a second terminal of said motor winding;

means, constituted at least in part by said sensor (25) and including semiconductor means, for producing a rotor position signal of large amplitude, a potential being supplied to said semiconductor means which is substantially equal to that of one pole (35) of said d.c. current source (33,35), and means for applying said rotor position signal (24) of large amplitude to the control electrodes of said transistors (47,48) providing said first pair of adjacent bridge arms through a resistance network (43;72) having a first resistance (46,75) connected between the output of said semiconductor means (25;70) and the control electrode of a first one (48) of said transistors of said first pair and a second resistance (44,73) connected between said output of said semiconductor means (25;70) and the control electrode of the second one (47) of said transistors of said first pair.

2. A motor as defined in claim 1, in which said first (46;75) and second (45;74) resistances are each connected in series with the capacitor (52;50) of an RC combination.

3. A motor as defined in claim 2, in which said capacitor of said RC combination is connected in series with the control electrode of the corresponding transistor (48,47) and said first or second resistance.

4. A motor as defined in claim 2, in which said capacitors are of the electrolytic type.

5. A motor as defined in claim 3 in which a leak resistor (47';48') is connected to each said RC combination for protecting the motor against blocking of the rotor.

6. A motor as defined in claim 1 in which said means for producing a rotor position signal of large amplitude has the output of said semiconductor means (25,70) connected to the control electrodes of the transistors (61,62) of said second pair of adjacent bridge arms without the interposition of any RC network.

7. A motor as defined in claim 1 in which said semiconductor means of said means for producing a rotor position signal of large amplitude comprises a Hall IC having a single rotor position signal output delivering a signal of large amplitude.

8. A motor as defined in claim 1 in which said semiconductor means of said means for producing a rotor position signal of large amplitude comprise a Hall IC and amplifying means (70) driven by the output of said Hall IC, the output of said amplifying means providing said rotor position signal of large amplitude.

9. A motor as defined in claim 1 in which a delay producing capacitor (56,57) is connected between two electrodes of each of said two transistors (47,48) of said first pair of adjacent bridge arms.

10. A motor as defined in claim 1 in which said four transistors of said bridge arms are each constituted as Darlington transistors.

* * * * *